US008503516B2

(12) United States Patent
Park et al.

(10) Patent No.: US 8,503,516 B2
(45) Date of Patent: Aug. 6, 2013

(54) METHOD OF MINIMIZING FEEDBACK OVERHEAD USING SPATIAL CHANNEL COVARIANCE IN A MULTI-INPUT MULTI-OUTPUT SYSTEM

(75) Inventors: Sungho Park, Gyeonggi-Do (KR); Binchul Ihm, Gyeonggi-Do (KR); Wookbong Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/320,988

(22) PCT Filed: Jun. 14, 2010

(86) PCT No.: PCT/KR2010/003806
§ 371 (c)(1),
(2), (4) Date: Nov. 17, 2011

(87) PCT Pub. No.: WO2010/147346
PCT Pub. Date: Dec. 23, 2010

(65) Prior Publication Data
US 2012/0069887 A1 Mar. 22, 2012

Related U.S. Application Data

(60) Provisional application No. 61/218,438, filed on Jun. 19, 2009.

(30) Foreign Application Priority Data

Feb. 12, 2010 (KR) ........................ 10-2010-0013601

(51) Int. Cl.
*H04B 1/38* (2006.01)
*H04L 27/00* (2006.01)
*H04L 27/28* (2006.01)
*H04L 1/02* (2006.01)
*H04B 7/02* (2006.01)

(52) U.S. Cl.
USPC ........... 375/220; 375/219; 375/260; 375/267; 375/259

(58) Field of Classification Search
USPC ........................................ 375/220, 219, 260
See application file for complete search history.

(56) References Cited

U.S. PATENT DOCUMENTS

| 6,504,506 B1 | 1/2003 | Thomas et al. |
| 7,801,247 B2 * | 9/2010 | Onggosanusi et al. ........ 375/299 |
| 2006/0040707 A1 * | 2/2006 | Kish et al. .................. 455/562.1 |

(Continued)

FOREIGN PATENT DOCUMENTS

WO 2005/109678 11/2005

OTHER PUBLICATIONS

Kermoal et al., "A Stochastic MIMO Radio Channel Model With Experimental Validation," Aug. 2002, IEEE Journal on Selected Areas in Communications, vol. 20, No. 6, pp. 1211-1226.*

Primary Examiner — Chieh M Fan
Assistant Examiner — Michelle M Koeth
(74) Attorney, Agent, or Firm — Morgan, Lewis & Bockius LLP

(57) ABSTRACT

Disclosed is a method for minimizing feedback overhead in a multi-input multi-output (MIMO) communication method using multiple transmission and reception antennas. In particular, a method for minimizing feedback overhead in a multi-input multi-output (MIMO) communication system by using spatial channel covariance, as explicit channel status information (CSI) feedback method is disclosed.

11 Claims, 2 Drawing Sheets

U.S. PATENT DOCUMENTS

| | | |
|---|---|---|
| 2009/0046768 A1* | 2/2009 | Pare, Jr. .................. 375/220 |
| 2009/0067513 A1 | 3/2009 | Kim et al. |
| 2009/0129501 A1* | 5/2009 | Mehta et al. .................. 375/299 |
| 2010/0238984 A1* | 9/2010 | Sayana et al. .................. 375/219 |
| 2011/0064156 A1* | 3/2011 | Kim et al. .................. 375/267 |
| 2013/0058426 A1* | 3/2013 | Porat et al. .................. 375/267 |

* cited by examiner

METHOD OF MINIMIZING FEEDBACK OVERHEAD USING SPATIAL CHANNEL COVARIANCE IN A MULTI-INPUT MULTI-OUTPUT SYSTEM

The present application is a national stage of PCT International Application No. PCT/KR2010/003806, filed Jun. 14, 2010, and claims the benefit of U.S. Provisional Application No. 61/218,438, filed Jun. 19, 2009. The present national stage application also claims the benefit of Korean Patent Application No. 10-2010-0013601, filed Feb. 12, 2010.

TECHNICAL FIELD

The present invention relates to a method of minimizing feedback overhead in a multi-input multi-output communication method and, more particularly, to a method of minimizing feedback overhead in a multi-input multi-output communication system by using a spatial channel covariance as one of methods of feeding back explicit channel status information (CSI).

BACKGROUND ART

Recently, diverse researches on providing multiple multimedia services including a voice service and transmitting high speed data while maintaining high quality in a radio communication environment are being conducted. In particular, technique for a multi-input multi-output (MIMO) communication system using a plurality of channels in a spatial area is being rapidly developed.

First, a general MIMO technique will now be described.

In brief, a MIMO refers to a method for improving data transmission and reception efficiency by using multiple transmission antennas and multiple reception antennas, shedding a system in which a single transmission antenna and a single reception antenna are used. Namely, the MIMO refers to a technique of seeking an increase in the capacity of data transmission or improvement of performance by using multiple antennas at a transmission end or at a reception end of a wireless communication system.

A multi-input multi-output technique (or a multi-antenna technique) is an application of a technique of collecting data fragments received by multiple antennas for a completion, rather than relying on a single antenna path for receiving a single entire message. Accordingly, a data transmission rate can be improved or an application range of the system can be increased over a particular data transmission rate.

A multi-antenna technique system using a MIMO scheme includes an open loop multi-antenna system that does not use feedback information from a reception end and a closed loop multi-antenna system that uses feedback information from the reception end. In detail, in the closed loop multi-antenna system, a reception end transmits feedback information regarding a channel status to a transmission end so that the transmission end can recognize the channel status based on the feedback information, thus improving performance of the multi-antenna system.

The closed-loop multi-antenna system uses an antenna grouping scheme in which a plurality of antennas of the transmission end are grouped, some of which are used for spatial multiplexing in order to improve a data transmission speed, while the others are used for diversity in order to improve reliability of a data transmission, an antenna selecting scheme in which the transmission end determines which one of antennas is optimal based on the channel information fed back from the reception end and dynamically selects an antenna involved in the MIMO, a precoding scheme in which the transmission end processes transmission data by using feedback information regarding a channel environment which has been from the reception end to minimize the influence of a channel, and the like.

In the method of transmitting the feedback, in general, channel status information (CSI) is fed back, and the channel status information feedback method may be divided into implicit CSI feedback information and explicit CSI feedback information. The implicit CSI feedback information is a method of changing or processing a channel status by using a method agreed by a mobile station and a base station, and such CSI information may include a CQI (Channel Quality Indicator), a PMI (Precoding Matrix Index), an RI (Rank Indicator), and the like. The explicit CSI feedback information is a method of transmitting channel status information itself or transmitting the channel status information maintaining its attribute, and in general, a channel vector/matrix, a channel covariance vector/matrix, etc are transmitted. The explicit CSI feedback information may be divided into full feedback (or analogue feedback) and a partial feedback depending on whether or not the entirety or a portion of the CSI is transmitted.

The explicit CSI feedback information includes a quantization method with respect to a long-term average of a spatial channel covariance. It is to divide an average with respect to channel covariance into diagonal components and off-diagonal components and perform quantization thereon as determined, thus reducing feedback overhead. For example, 1 bit quantization is performed on the diagonal components and 4 bit quantization is performed on the off-diagonal components.

As mentioned above, a method for minimizing feedback overhead is required in order to achieve an effective multi-input multi-output communication system.

However, the foregoing quantized CSI feedback method discussed in the related art is advantageous in that feedback overhead can be reduced independently from antenna configuration but has shortcomings in that the amount of feedback rapidly increases as the number of transmission antennas is increased. For example, 128-bit quantization is performed on eight transmission antennas, and such a large amount of feedback degrades the efficiency of the overall system.

DISCLOSURE OF INVENTION

Solution to Problem

Therefore, in order to address the above matters, the various features described herein have been conceived.

An aspect of the present invention provides a method for minimizing for feedback overhead in a multi-input multi-output (MIMO) system. In particular, an aspect of the present invention provides a method for minimizing feedback overhead in a multi-input multi-output (MIMO) communication system by using spatial channel covariance, as explicit channel status information (CSI) feedback method.

According to an aspect of the present invention, there is provided a method for performing feedback in a multi-antenna system, including: measuring, by a reception end, a spatial channel of the multi-antenna system; calculating a spatial channel covariance by using the measured spatial channel; determining feedback information from the calculated spatial channel covariance; and transmitting the determined feedback information to a transmission end.

The method may further include: determining whether or not antenna configuration information has been received from the transmission end.

If it is determined that the antenna configuration information has been received from the transmission end, the feedback information may be determined with a predefined closed form with respect to a corresponding antenna configuration in the calculated spatial channel covariance.

If it is determined that the antenna configuration information has not been received from the transmission end, the feedback information may be determined with the most suitable closed form among all the predefined closed forms in the calculated spatial channel covariance.

The method may further include: quantizing the determined feedback information.

The spatial channel covariance may be calculated through a normalization process.

The determined feedback information may include at least one of a constant (C) and a correlation coefficient.

The antenna configuration information may be classified into a uniform linear array (ULA), a uniform circular array (UCA) or a cross polarized array (CPA).

The method may further include: reconstructing the spatial channel covariance after the transmission end receives the feedback information.

The method may further include: determining, by the transmission end, a precoding matrix according to the reconstructed spatial channel covariance.

The present invention proposes the method for minimizing feedback overhead in a multi-input multi-output (MIMO) communication system by using spatial channel covariance, as explicit channel status information (CSI) feedback method, in a MIMO communication method using multiple transmission and reception antennas. According to the proposed method, feedback overhead can be minimized in the MIMO communication system, so data can be effectively transmitted and received in the MIMO communication system while less consuming allocated radio resources without a short time.

The foregoing and other objects, features, aspects and advantages of the present invention will become more apparent from the following detailed description of the present invention when taken in conjunction with the accompanying drawings.

MODE FOR THE INVENTION

Figure 1:
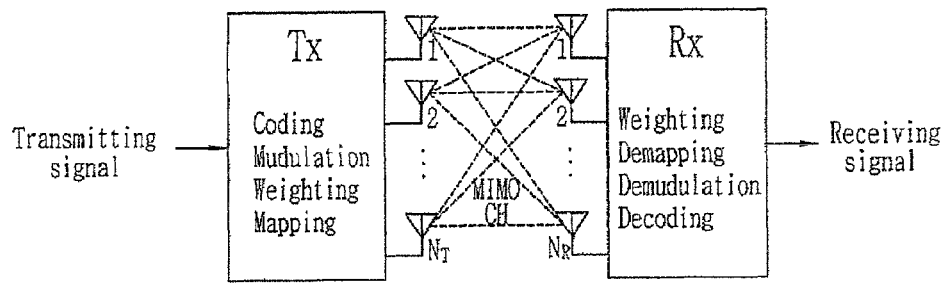
FIG. 1 illustrates a multi-input multi-output (MIMO) communication system to which the related art and the present invention are applied.

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, this disclosure may also be applied to other communication systems operating in conformity with different standards and specifications.

The present invention proposes a method for performing feedback in a multi-antenna system, as a method for minimizing feedback overhead in a multi-input multi-output communication method, compared with the related art, including: measuring, by a reception end, a spatial channel of the multi-antenna system; calculating a spatial channel covariance by using the measured spatial channel; determining feedback information from the calculated spatial channel covariance; and transmitting the determined feedback information to a transmission end. The present invention also proposes a wireless communication mobile station or a base station that can perform the method.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

The exemplary embodiments of the present invention described hereinafter can be applicable to a multi-carrier multi-access system in consideration of mobility of a mobile station, for example a mobile communication system using OFDM. Also, the exemplary embodiments of the present invention can be applicable to MC (Multi carrier)-CDMA, SC (Single carrier)-FDMA, WH (Walsh-Hadamard)-FDMS, DFT (Discrete Fourier Transform) spread OFDMA.

Also, the technical features of the present invention described hereinafter, which can be applicable to an E-UMTS (Evolved Universal Mobile Telecommunications System) also called an LTE (Long Term Evolution), is obviously applicable to other similar mobile communication system such as IEEE 802.16m, a WiBro system, and the like.

The E-UMTS system has been evolved from the existing WCDMA UMTS system, and currently, 3GPP ($3^{rd}$ Generation Partnership Project) performs basic standardization operation of the E-UMTS system. Details of the technical specification of the UMTS and the E-UMTS can be referred to Release 7 and Release 8 of "3rd Generation Partnership Project; Technical Specification Group Radio Access Network".

In some cases, a known structure and/or device may be omitted to avoid an ambiguous concept, and the present invention may be represented by a block diagram and/or flow chart based on a core function of each structure and/or device.

In general, a communication system is widely disposed to provide various communication services such as voice, packet data, and the like. This technique may be used for downlink or uplink. Downlink refers to communication from a base station to a mobile station, and uplink refers to communication from the mobile station to the base station. In general, the base station is a fixed point communicating with the mobile station and includes a network excluding the mobile station in the communication system including an upper layer as well as a physical transmission stage. Thus, in an exemplary embodiment of the present invention, the network and the base station are parts symmetrical to the mobile station, having the same meaning. Here, the mobile station may be fixed or have mobility.

FIG. 1 is a view showing the configuration of a multi-antenna system (or a multi-input multi-output (MIMO) communication system) to which the related art and the present invention are applied.

As shown in FIG. 1, when the number of transmission antennas is increased to NT number and the number of reception antennas is increased to NR number, simultaneously, a theoretical channel transmission capacity can be increased in proportion to the number of antennas, so a transmission rate and a frequency efficiency can be drastically improved. Namely, for example, in a MIMO communication system using four transmission antennas and four reception antennas, theoretically, four-fold transmission rate can be obtained compared with a single antenna system.

The multi-antenna technique may be divided into a spatial diversity scheme having an enhanced transmission reliability by using symbols that have passed through various channel paths and a spatial multiplexing scheme for improving a transmission rate by simultaneously transmitting a plurality of data symbols by using multiple transmission antennas. Also, a method of suitably combining the two schemes and taking the advantage of both schemes may be also used.

Figure 2:
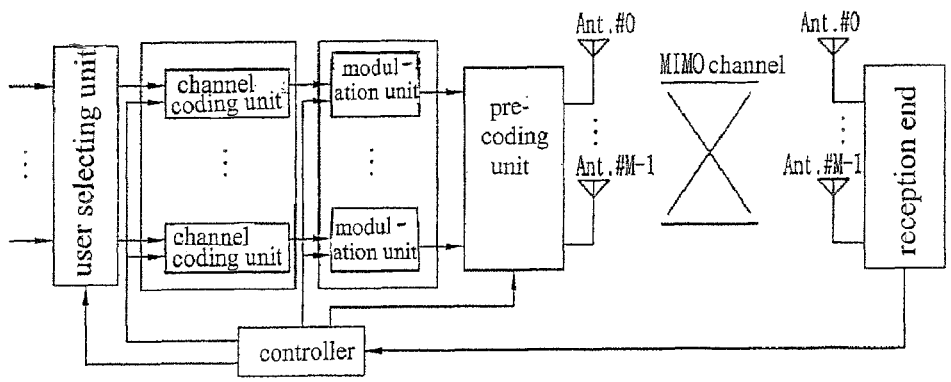
FIG. 2 is a schematic block diagram showing the configuration of a transmission end and a reception end of a codebook-based MIMO system according to an exemplary embodiment of the present invention.

FIG. 2 is a schematic block diagram showing the configuration of a transmission end and a reception end of a codebook-based MIMO system according to an exemplary embodiment of the present invention.

First, a transmission end of FIG. 2 may be a base station or a mobile station. As illustrated in FIG. 2, as for user data to be transmitted from the transmission end to a reception end, a single data stream or one of multiple data streams is selected by a user selecting unit and inputted to a channel coding unit. Thereafter, the channel coding performs channel coding. Also, a modulation unit performs constellation mapping on the channel-coded user data, the symbolized user data are multiplied by a precoding matrix in a precoding unit, and then transmitted to each antenna. In the example illustrated in FIG. 2, a multi-antenna system is assumed to have M number of antennas in the transmission end and M number of antennas in the reception end.

The user data transmitted through the antennas of the transmission end is input to the antennas of the reception end through a radio channel. The reception end may recognize a channel status and transmit feedback information including an optimum codebook index, namely, a precoding matrix index (PMI), to the transmission end. Then, the precoding unit of the transmission end may receive the feedback codebook index through a controller and apply a precoding matrix corresponding to the feedback codebook index to the user data. The feedback information may further include a channel quality indicator (CQI) or the like, and the controller may perform selecting on a user or optimum precoding matrixes by using the feedback information from the reception end and inform the precoding unit accordingly.

As discussed above, the present invention proposes a method for effectively reducing feedback overhead by obtaining a transmission end or reception end covariance by using a covariance with respect to a spatial channel measured in a spatial channel environment and transmitting the obtained transmission end or reception covariance.

A detailed procedure and process according to an exemplary embodiment of the present invention will now be described.

First, a spatial channel modeling will now be described. When there are one or more antennas in the transmission end or reception end, a spatial signature exists in each antenna. Thus, the spatial channel includes a spatial correlation or spatial covariance as a spatial signature.

Equation 1 shown below describes the spatial channel using the spatial covariance.

$$H = \text{unvec}(R^{1/2}\text{vec}(H_w)) (\Leftarrow \text{vec}(H) = R^{1/2}\text{vec}(H_w))$$ [Equation 1]

In Equation 1, Hw is Spatial white $N_R \times N_T$ MIMO channel, R is indicated by $E\{\text{vec}(H)^H \text{vec}(H)\}$ or $R = R_{Tx} \otimes R_{Rx}$ as a spatial covariance. vec(□) indicates vectorization, and unvec (□) is a reverse process of the vectorization.

The spatial channel modeling may be represented by Equation 2 shown below by using correlation of the transmission end or the reception end:

$$H = R_{Rx}^{1/2} H_w R_{Tx}^{1/2}$$ [Equation 2]

In Equation 2, $R_{Rx}$ is a reception correlation of $N_R \times N_R$, and $R_{Tx}$ is a transmission correlation of $N_T \times N_T$.

The spatial channel covariance will now be described in detail.

The spatial covariance R in Equation 1 can be obtained by a Kronecker Product with respect to the transmission end correlation and the reception end correlation as represented by Equation 3 shown below:

$$R = R_{Tx} \otimes R_{Rx}$$ [Equation 3]

In Equation 3, $R_{Rx}$ is a reception end correlation matrix, $R_{Tx}$ indicates a transmission end correlation matrix. ⊗ is a Kronecker product. When $$R_{Tx} = \begin{bmatrix} 1 & \alpha^* \\ \alpha & 1 \end{bmatrix},$$

R is calculated as $$R = \begin{bmatrix} R_{Rx} & \alpha^* R_{Rx} \\ \alpha R_{Rx} & R_{Rx} \end{bmatrix}.$$

Accordingly, the mobile station (or the base station) only needs to transmit feedback information by using Equation 3, so the amount of feedback can be reduced compared with the related art.

Here, the spatial covariance R has a different form according to the antenna configuration. Equation 4 and Equation 5 below show the cases in the general ULA (Uniform Linear Array) and Cross-polarized Antenna Array as examples.

a) General Uniform Linear Array $$R = R_{Tx} \otimes R_{Rx}$$ [Equation 4]

b) Cross Polarized Antenna Array $$R = R_{Tx} \otimes \Gamma \otimes R_{Rx}$$ [Equation 5]

In Equation 5, Γ is a polarized covariance matrix expressing propagation characteristics between a horizontal polar and a vertical polar of each antenna element. Thus, Γ has a different form according to the cross-polarization configuration in the transmission end or the reception end, and thus, the form of R may be also changed.

A spatial covariance based on the channel status information (CSI) feedback method will now be described.

First, in an explicit CSI feedback, H measured in the reception end may be immediately fed back, but the measured H has a relatively high feedback overhead or is sensitive to a quantization error. Thus, the present invention considers a method of feeding back a spatial covariance instead of H.

First, a spatial channel covariance obtained by using H measured in the reception end can be expressed by Equation 6 shown below:

$$R = E\{\text{vec}(H)^H \text{vec}(H)\} \quad \text{[Equation 6]}$$

Figure 3:
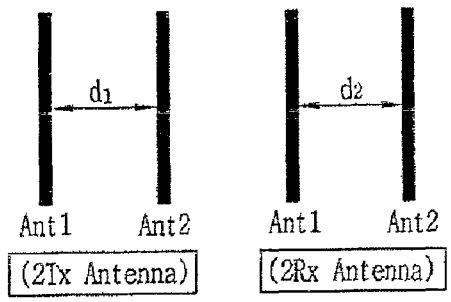
FIG. 3 illustrates an array of co-polarized antennas including two transmission and reception antennas without a tilt angle according to an exemplary embodiment of the present invention.

In Equation 6, R is $N_T \times N_T$, which can be expressed in the form with respect to a transmission covariance of a different form according to each antenna configuration. FIG. 3 illustrates a co-polarized antenna array including two transmission antennas and two reception antennas without a slant angle to which the present invention is applied. As shown in FIG. 3, in the case of the co-polarized antenna array in which the two transmission antennas and two reception antennas are provided and the transmission and reception ends have a slant angle 0°, R is represented by Equation 7 shown below:

$$R = E\{H^H H\} = 2 \begin{bmatrix} 1 & \alpha \\ \alpha^* & 1 \end{bmatrix} \quad \text{[Equation 7]}$$

Figure 4:
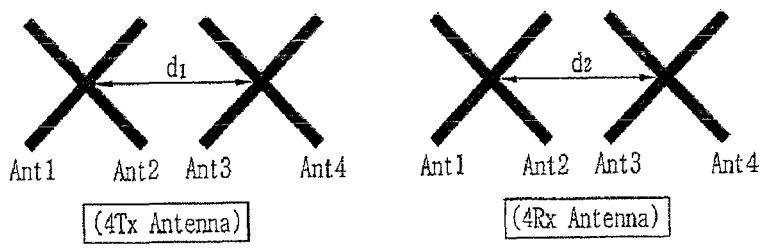
FIG. 4 illustrates an array of cross-polarized antennas including four transmission and reception antennas according to an exemplary embodiment of the present invention.

FIG. 4 illustrates an array of cross-polarized antennas including four transmission and reception antennas according to an exemplary embodiment of the present invention. As shown in FIG. 4, when the four transmission antennas and four reception antennas are provided and both the transmission end and the reception end have the cross-polarized antenna array, R is represented by Equation 8 shown below:

$$R = E\{H^H H\} = 4 \begin{bmatrix} 1 & 0 & \alpha & 0 \\ 0 & 1 & 0 & \alpha \\ \alpha^* & 0 & 1 & 0 \\ 0 & \alpha^* & 0 & 1 \end{bmatrix} \quad \text{[Equation 8]}$$

As illustrated, different forms of transmission covariances appear according to the configuration of each antenna, and when the transmission end is a ULA (Co-polarized array with slant angle 0°), it can be represented by Equation 9 after generalizing Equation 7:

$$R \Rightarrow C \begin{bmatrix} 1 & \alpha & \cdots & \alpha^{Nt-1} \\ \alpha^* & 1 & \ddots & \vdots \\ \vdots & \ddots & \ddots & \alpha \\ \alpha^{*Nt-1} & \cdots & \alpha^* & 1 \end{bmatrix} \quad \text{[Equation 9]}$$

Also, when the transmission end is the cross-polarized antenna array, it can appear to be similar to Equation 8. Equation 10 below represents a closed form when the cross-polarized antenna array is assumed.

$$R'' = C(P^H R' P), \quad \text{[Equation 10]}$$

where P: permutation matrix,
R': Covariance including the correlation between co-located polarized antenna elements In Equation 10, P is determined according to an antenna Configuration, and, R' is determined according to polarized antenna characteristics.

For example, in the polarized antenna configuration, when the co-located polarized antenna elements are orthogonal (Ant1 and Ant2) and the correlation characteristics between the antenna elements having the same polar characteristics (Ant1 and Ant3 or Ant2 and Ant4), Equation 10 can be represented by Equation 11 shown below:

$$R'' = \begin{bmatrix} 1 & 0 & \alpha & 0 & \cdots & \alpha^{Nt-1} \\ 0 & 1 & 0 & \alpha & \cdots & 0 \\ \alpha^* & 0 & 1 & 0 & \cdots & \vdots \\ 0 & \alpha^* & 0 & 1 & 0 & \alpha \\ \vdots & \vdots & \cdots & \cdots & \ddots & 0 \\ \alpha^{*Nt-1} & 0 & \cdots & \alpha^* & 0 & 1 \end{bmatrix} \quad \text{[Equation 11]}$$

In Equation 11, $\alpha$ is affected by the antenna distance d, and when the transmission antenna is ULA, $N_1$ indicates the order with respect to the number of antenna elements, and when the transmission antenna is the cross-polarized array, N1 indicates the order with respect to the number of groups when the co-located polarized antenna elements are considered as a group.

As a result, as for R measured by the reception end from Equation 11 in Equation 7, when Constant C and correlation coefficient(s) $\alpha$ are transmitted, a spatial covariance R can be reconstructed according to each antenna configuration. In this case, the transmission end must know about a pre-defined set of R with respect to each antenna configuration. Also, the reception end must know about a pre-defined set of R with respect to each antenna configuration as necessary.

A channel status information (CSI) feedback method considered in the present invention will now be described.

First, according to content of feedback, a) both the constant and the correlation coefficient(s) $\alpha$ may be transmitted, b) only the correlation coefficient(s) $\alpha$ may be transmitted, c) antenna configuration information may be transmitted in addition to the constant and the correlation coefficient(s) $\alpha$, or d) the antenna configuration information may be transmitted in addition to the correlation coefficient(s) $\alpha$.

Also, according to whether or not quantization is performed, 1) full feedback may be transmitted, or b) quantized feedback may be transmitted.

The base station and the mobile station configure R according to the antenna configuration of the base station based on the transmitted channel status information (CSI). As additional information for supporting it, the antenna configuration information with respect to the base station (or the mobile station) may be provided to the mobile station (or the base station).

The order of feeding back the spatial covariance proposed in the present invention will now be described.

If a closed form set with respect to R is pre-defined according to different antenna configurations, in a first stage, the base station (or the mobile station) may inform the mobile station (or the base station) about the antenna configuration or may not. Thereafter, in a second state, the mobile station (or the base station) measures a channel H (spatial channel) and calculates R (spatial channel covariance) by using the measured H. Thereafter, in a third stage, the mobile station (or the base station) determines feedback (or feedforward) information (e.g., (C and/or $\alpha$). Here, when the base station (or the mobile station) informs the mobile station (or the base station) about the antenna configuration, the mobile station (or the base station) compares the predefined closed forms with respect to the corresponding antenna configuration in the calculated R, and determines feedback information. However, if the base station (or the mobile station) does not inform the mobile station (or the base station) about the antenna configuration in the first stage, the mobile station (or the base station) compares all the predefined closed forms in the calculated R to find out the most suitable closed form, and determines corresponding feedback (or feedforward) information. Thereafter, in a fourth stage, the feedback (or feedforward) channel status information (CSI) may be quantized. Namely, the CSI information may be configured as full feedback (or feedforward) or quantization may be performed on the CSI information, which may be then fed back (or fed forward). Thereafter, in the final stage, the base station (or the mobile station) may reconstruct R (spatial channel covariance) by using the feedback (or feedforward) CSI.

A normalization of the spatial channel covariance will now be described.

The closed form of Equation 10 or Equation 11 is possible when frequency selectivity and time varying characteristics, besides, the spatial signature, become flat or invalid. However, in general, H measured by the base station (or the mobile station) has characteristics that it is changed in a time domain due to a Doppler spread or frequency selection is available by a multi-path. Thus, R (spatial channel covariance) calculated from H measured at a particular moment does not have such a form as shown in Equation 10 or Equation 11. Thus, in order to solve this problem, Windowing for a sample averaging is applied and a normalization process of each element is required in the time domain.

Thus, the present invention proposes a method for increasing a convergence effect with respect to H through the following four types of normalizations and windowing.

$$R = \sum_t^{W_t} \left(\frac{1}{B}\sum_{i=1}^{B} H_i^H H_i\right)_t \bigg/ \mathrm{argmax}\left(\sum_t^{W_t} \left(\frac{1}{B}\sum_{i=1}^{B} H_i^H H_i\right)_t\right) \quad \text{a)}$$

$$R = \frac{1}{W_t}\sum_t^{W_t} \left(\frac{1}{B}\sum_{i=1}^{B} H_i^H H_i\right)_t \bigg/ \mathrm{argmax}\left(\frac{1}{W_t}\sum_t^{W_t} \left(\frac{1}{B}\sum_{i=1}^{B} H_i^H H_i\right)_t\right) \quad \text{b)}$$

$$R = \frac{1}{W_t}\sum_t^{W_t} \left\{\frac{1}{B}\sum_{i=1}^{B} \{(H_i^H H_i)/(\mathrm{argmax}(H_i^H H_i))\}\right\}_t \bigg/ \mathrm{arg} \quad \text{c)}$$

$$\mathrm{max}\left(\frac{1}{W_t}\sum_t^{W_t} \left\{\frac{1}{B}\sum_{i=1}^{B} \{(H_i^H H_i)/(\mathrm{argmax}(H_i^H H_i))\}\right\}_t\right)$$

$$R = \frac{1}{W_t}\sum_t^{W_t} \left\{\left(\frac{1}{B}\sum_{i=1}^{B} (H_i^H H_i)\right)\bigg/\left(\mathrm{argmax}\left(\frac{1}{B}\sum_{i=1}^{B} (H_i^H H_i)\right)\right)\right\}_t \bigg/ \mathrm{arg} \quad \text{d)}$$

$$\mathrm{max}\left(\frac{1}{W_t}\sum_t^{W_t} \left\{\left(\frac{1}{B}\sum_{i=1}^{B} (H_i^H H_i)\right)\bigg/\left(\mathrm{argmax}\left(\frac{1}{B}\sum_{i=1}^{B} (H_i^H H_i)\right)\right)\right\}_t\right)$$

In the above equations, B is an effective frequency bandwidth and WT indicates a window size.

As mentioned above, according to an exemplary embodiment of the present invention, in a state that the base station (or the mobile station) knows about the antenna configuration, when the feedback parameter or feedback information such as the constant C or $\alpha$ is received by normalizing the covariance matrix, the covariance matrix is reconstructed, and a precoding matrix can be determined according to the reconstructed covariance matrix.

Figure 5:
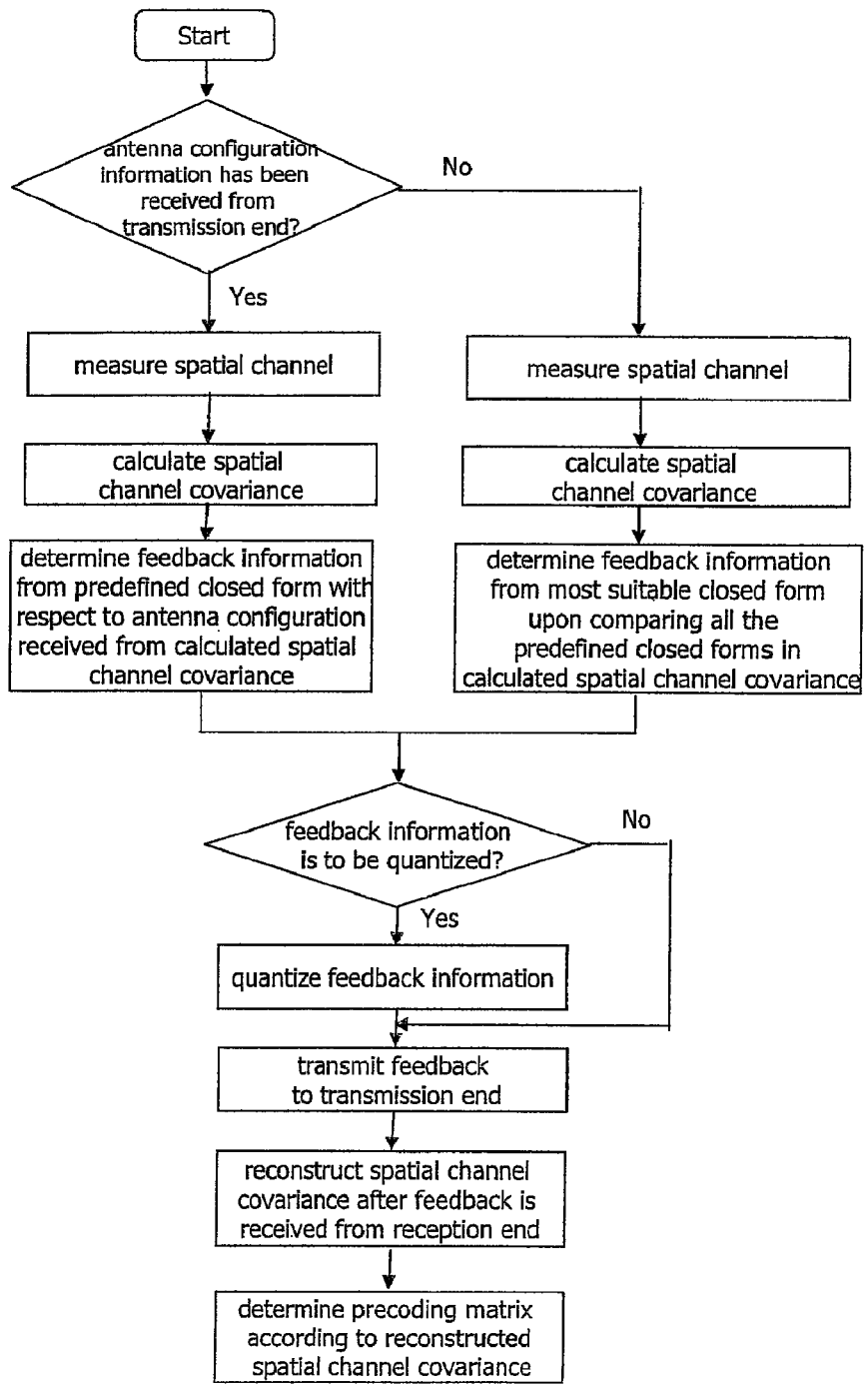
FIG. 5 is a flow chart illustrating the process of a method for minimizing feedback overhead in the MIMO system according to an exemplary embodiment of the present invention.

FIG. 5 is a flow chart illustrating the process of a method for minimizing feedback overhead in the MIMO system according to an exemplary embodiment of the present invention.

As shown in FIG. 5, the reception end (the base station or the mobile station) may determine whether or not antenna configuration has been received from the transmission end (the mobile station or the base station). If the antenna configuration information has been received from the transmission end, the reception end may measure a spatial channel, calculate a spatial channel covariance by using the measured spatial channel, and determine feedback information in a closed from predefined for the received antenna configuration. If the antenna configuration has not been received from the transmission end, the reception end may measure a spatial channel, calculate a spatial channel covariance by using the measured spatial channel, and compare all the closed forms predefined in the calculated spatial channel covariance to determine feedback information in the most suitable closed form. After the feedback information is determined, the reception end may determine whether to perform quantization on the feedback information. If the quantization procedure is required, the reception end may perform quantization on the feedback information. Thereafter, the feedback may be transmitted to the transmission end. After the transmitted feedback is received by the transmission end, the transmission end may reconstruct the spatial channel covariance and determine a precoding matrix according to the reconstructed spatial channel covariance.

The present invention may provide a method for performing feedback in a multi-antenna system, the method comprising: measuring, by a reception end, a spatial channel of the multi-antenna system; calculating a spatial channel covariance by using the measured spatial channel; determining feedback information from the calculated spatial channel covariance; transmitting the determined feedback information to a transmission end; determining whether or not antenna configuration information has been received from the transmission end; quantizing the determined feedback information; reconstructing the spatial channel covariance after the transmission end receives the feedback information; determining, by the transmission end, a precoding matrix according to the reconstructed spatial channel covariance, wherein if it is determined that the antenna configuration information has been received from the transmission end, the feedback information is determined with a predefined closed form with respect to a corresponding antenna configuration in the calculated spatial channel covariance, if it is determined that the antenna configuration information has not been received from the transmission end, the feedback information is determined with the most suitable closed form among all the predefined closed forms in the calculated spatial channel covariance, the spatial channel covariance is calculated through a normalization process, the determined feedback information comprises at least one of a constant (C) and a correlation coefficient, the antenna configuration information is classified into a uniform linear array (ULA), a uniform circular array (UCA) or a cross polarized array (CPA).

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method for performing feedback in a multi-antenna system, the method comprising:
    measuring, by a reception end, a spatial channel of the multi-antenna system;
    calculating a spatial channel covariance by using the measured spatial channel;
    determining feedback information from the calculated spatial channel covariance;
    determining whether or not antenna configuration information has been received from the transmission end,
    wherein if it is determined that the antenna configuration information has been received from the transmission end, the feedback information is determined with a predefined closed form with respect to a corresponding antenna configuration in the calculated spatial channel covariance; and
    transmitting the determined feedback information to a transmission end,
    wherein if it is determined that the antenna configuration information has not been received from the transmission end, the feedback information is determined with a certain closed form among all predefined closed forms in the calculated spatial channel covariance,
    wherein when a transmission end is a cross-polarized antenna array, the predefined closed form is represented by:
    $R'' = C(P^H R'P)$,
    where P: permutation matrix,
        R': Covariance including the correlation between co-located polarized antenna elements,
        C: constant.

2. The method of claim 1, further comprising: quantizing the determined feedback information.

3. The method of claim 1, wherein the spatial channel covariance is calculated through a normalization process.

4. The method of claim 1, wherein the determined feedback information comprises at least one of a constant and a correlation coefficient.

5. The method of claim 1, wherein the antenna configuration information is classified into a uniform linear array (ULA), a uniform circular array (UCA) or the cross polarized array (CPA).

6. The method of claim 1, further comprising: reconstructing the spatial channel covariance after the transmission 7 receives the feedback information.

7. The method of claim 6, further comprising: determining, by the transmission end, a precoding matrix according to the reconstructed spatial channel covariance.

8. The method of claim 1, wherein the certain closed form is determined by comparing all the predefined closed forms in the calculated spatial channel covariance.

9. The method of claim 1, wherein the spatial channel covariance is calculated by applying a windowing for a sample average and by performing a normalization process of parameters in a time domain.

10. The method of claim 1, wherein when four transmission antennas and four reception antennas are provided with the cross-polarized antenna array, the spatial channel covariance is represented by:

$$R = E\{H^H H\} = 4 \begin{bmatrix} 1 & 0 & \alpha & 0 \\ 0 & 1 & 0 & \alpha \\ \alpha^* & 0 & 1 & 0 \\ 0 & \alpha^* & 0 & 1 \end{bmatrix}$$

where H: spatial channel.

11. The method of claim 1, wherein the permutation matrix in the predefined closed form is determined by the corresponding antenna configuration.

* * * * *